US010141599B2

United States Patent
Mukai et al.

(10) Patent No.: US 10,141,599 B2
(45) Date of Patent: Nov. 27, 2018

(54) NON-AQUEOUS ELECTROLYTE SECONDARY BATTERY

(71) Applicant: SANYO Electric Co., Ltd., Osaka (JP)

(72) Inventors: Natsuhiko Mukai, Osaka (JP); Masato Fujikawa, Osaka (JP)

(73) Assignee: SANYO ELECTRIC CO., LTD., Osaka (JP)

(*) Notice: Subject to any disclaimer, the term of this patent is extended or adjusted under 35 U.S.C. 154(b) by 398 days.

(21) Appl. No.: 14/779,012

(22) PCT Filed: Feb. 27, 2014

(86) PCT No.: PCT/JP2014/001073

§ 371 (c)(1),
(2) Date: Sep. 22, 2015

(87) PCT Pub. No.: WO2014/155971

PCT Pub. Date: Oct. 2, 2014

(65) Prior Publication Data

US 2016/0049684 A1 Feb. 18, 2016

(30) Foreign Application Priority Data

Mar. 29, 2013 (JP) ................................ 2013-072763

(51) Int. Cl.
*H01M 10/052* (2010.01)
*H01M 10/04* (2006.01)
(Continued)

(52) U.S. Cl.
CPC ....... *H01M 10/0431* (2013.01); *H01M 4/139* (2013.01); *H01M 10/0525* (2013.01);
(Continued)

(58) Field of Classification Search
None
See application file for complete search history.

(56) References Cited

U.S. PATENT DOCUMENTS 5,989,743 A * 11/1999 Yamashita .............. H01M 2/34 429/129
6,461,759 B1 * 10/2002 Miller ..................... H01M 4/02 429/127
(Continued)

FOREIGN PATENT DOCUMENTS

JP 8-153542 6/1996
JP 2007-109612 4/2007
(Continued)

OTHER PUBLICATIONS

International Search Report of PCT application No. PCT/JP2014/001073 dated Apr. 8, 2014.

*Primary Examiner* — Jeremiah R Smith
(74) *Attorney, Agent, or Firm* — McDermott Will & Emery LLP

(57) ABSTRACT

A non-aqueous electrolyte secondary battery includes battery element formed by laminating and winding positive electrode and negative electrode via separator. Positive electrode includes a positive electrode current-collector-exposed portion, in which the positive electrode current collector is exposed over a length dimension of not less than one turn of the winding of battery element in the outermost circumference and an intermediate layer portion of the winding. The negative electrode in a part facing the positive electrode current collector exposed in the intermediate layer portion includes the negative electrode active material layer laminated on the negative electrode current collector. Negative electrode can be provided with a slit at an exposed side with respect to both exposed ends of the positive electrode current-collector-exposed portion.

3 Claims, 6 Drawing Sheets

(51) Int. Cl.

| | |
|---|---|
| ***H01M 4/139*** | (2010.01) |
| ***H01M 10/0587*** | (2010.01) |
| ***H01M 10/0525*** | (2010.01) |
| *H01M 10/28* | (2006.01) |
| *H01M 10/12* | (2006.01) |

(52) U.S. Cl.

CPC .... *H01M 10/0587* (2013.01); *H01M 10/0409* (2013.01); *H01M 10/125* (2013.01); *H01M 10/286* (2013.01)

(56) References Cited

U.S. PATENT DOCUMENTS

| | | | | |
|---|---|---|---|---|
| 7,501,201 | B2 * | 3/2009 | Ishikawa | H01M 10/0431 29/623.1 |
| 7,807,292 | B2 * | 10/2010 | Takagi | H01M 4/38 429/161 |
| 9,520,588 | B2 * | 12/2016 | Sugita | H01M 10/0587 |
| 2005/0042516 | A1 * | 2/2005 | Oh | H01M 2/1686 429/246 |
| 2006/0154139 | A1 * | 7/2006 | Fujikawa | H01M 2/145 429/130 |

FOREIGN PATENT DOCUMENTS

| | | |
|---|---|---|
| JP | 2013-026072 | 2/2013 |
| WO | 2013/014833 | 1/2013 |
| WO | 2013/038701 | 3/2013 |

* cited by examiner (a)
(b)
(c)
inner circumferential end
outer peripheral edge
outer circumference side surface
N=1
N=2
N=3
N=4
N=5
N=6
N=7
3
4
5
15
20
21
22
24
25
26
30
31
40
41

(a)
(b)
14
5
26
51
31
22
30
52
25
50
24
3
20
21

NON-AQUEOUS ELECTROLYTE SECONDARY BATTERY

CROSS-REFERENCE TO RELATED APPLICATIONS

This application is a U.S. national stage application of the PCT International Application No. PCT/JP2014/001073 filed on Feb. 27, 2014, which claims the benefit of foreign priority of Japanese patent application 2013-072763 filed on Mar. 29, 2013, the contents all of which are incorporated herein by reference.

TECHNICAL FIELD

The present invention relates to a non-aqueous electrolyte secondary battery.

BACKGROUND ART

As a non-aqueous electrolyte secondary battery, a wound type battery is used. In this type battery, a battery element is formed by laminating and winding a positive electrode including a positive electrode active material layer on both surfaces of a positive electrode current collector and a negative electrode including a negative electrode active material layer on both surfaces of a negative electrode current collector with a separator interposed therebetween, and the battery element is housed in a battery can.

When a wound-type non-aqueous electrolyte secondary battery is crushed by pressure from the outside or a separator between a positive electrode and a negative electrode is broken or melted, and a short-circuit occurs between the positive electrode and the negative electrode in the battery, abnormal heat generation may occur.

In order to prevent such situations and to improve safety, PTL 1 discloses that a wound-type non-aqueous secondary battery is provided with a current collector opposing surface, in which a positive electrode current-collector-exposed portion and a negative electrode current-collector-exposed portion are allowed to face each other, on both ends of each of a positive electrode and a negative electrode. According to the disclosure, the positive electrode current-collector-exposed portion may be provided on one surface of the positive electrode current collector. However, when the positive electrode current-collector-exposed portion is provided on both surfaces, contact of metal with low resistance can be obtained more reliably.

Furthermore, PTL 2 discloses that it may be insufficient to provide a current collector opposing surface in which a positive electrode current-collector-exposed portion and a negative electrode current-collector-exposed portion are allowed to face each other on both ends of each of the positive electrode and the negative electrode Therefore, PTL2 discloses that the current collector opposing surface in which the positive electrode current-collector-exposed portion and the negative electrode current-collector-exposed portion are allowed to face each other is provided also in an intermediate part of winding.

CITATION LIST

Patent Literature

PTL 1: Japanese Patent Application Unexamined Publication No. H8-153542

PTL 2: Japanese Patent Application Unexamined Publication No. 2007-109612

SUMMARY OF THE INVENTION

Problems to be Solved by the Invention

There is a demand for a non-aqueous electrolyte secondary battery capable of obtaining a low-resistance contact state between a positive electrode and a negative electrode with a simple configuration even when the positive electrode and the negative electrode are short-circuited in a battery.

Means for Dissolving Problems

A non-aqueous electrolyte secondary battery in accordance with the present invention includes a battery element formed by laminating and winding a positive electrode and a negative electrode with a separator interposed therebetween, wherein the positive electrode includes a positive electrode current collector and a positive electrode active material layer formed on both surfaces of the positive electrode current collector, and the negative electrode includes a negative electrode current collector and a negative electrode active material layer having a lower resistance value than that of the positive electrode active material layer and formed on both surfaces of the negative electrode current collector; and a battery can housing the battery element. The positive electrode includes a positive electrode current-collector-exposed portion, in which the positive electrode current collector is exposed over a length dimension of not less than one turn of the winding of the battery element, in an intermediate layer portion of the winding, and the negative electrode in a part facing the positive electrode current collector exposed in the intermediate layer portion includes the negative electrode active material layer laminated on the negative electrode current collector.

A non-aqueous electrolyte secondary battery in accordance with the present invention includes a battery element formed by laminating and winding a positive electrode and a negative electrode with a separator interposed therebetween, wherein the positive electrode includes a positive electrode current collector and a positive electrode active material layer formed on both surfaces of the positive electrode current collector, and the negative electrode includes a negative electrode current collector and a negative electrode active material layer having a lower resistance value than that of the positive electrode active material layer and formed on both surfaces of the negative electrode current collector; and a battery can housing the battery element. The positive electrode includes a positive electrode current-collector-exposed portion, in which the positive electrode current collector is exposed over a length dimension of not less than one turn of the winding of the battery element, in an intermediate layer portion of the winding, and the negative electrode includes an active material layer separation portion, which suppresses diffusion of ions contributing to electromotive force through the negative electrode active material layer, at an exposed side with respect to both exposed ends of the positive electrode current-collector-exposed portion.

Advantages of the Invention

A non-aqueous electrolyte secondary battery having the above-mentioned configuration does not need a negative electrode current-collector-exposed portion confronting a positive electrode current-collector-exposed portion. Therefore, a low-resistance contact state between a positive electrode and a negative electrode can be obtained with a simple configuration even when a short-circuit occurs between the positive electrode and the negative electrode in a battery.

DESCRIPTION OF EMBODIMENTS

Figure 1:
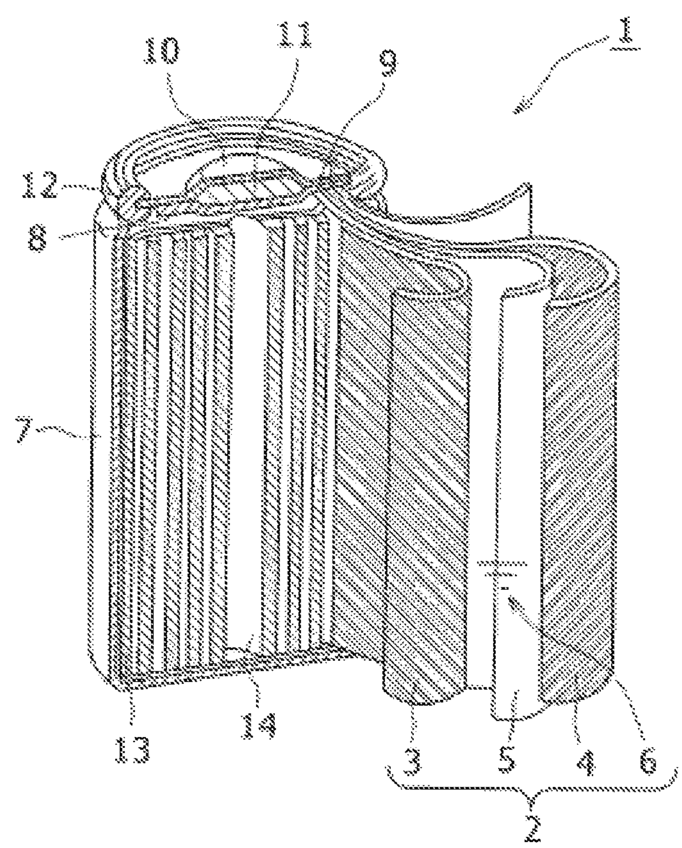
FIG. 1 is a structural view of an example of a non-aqueous electrolyte secondary battery in accordance with an exemplary embodiment of the present invention.

Hereinafter, the exemplary embodiment of the present invention is described in detail with reference to the drawings. Material, dimensions, shapes, and the like, mentioned below are examples for description, and may be appropriately modified in accordance with specifications of a non-aqueous electrolyte secondary battery. Hereinafter, in all drawings, the same reference numerals are given to the corresponding elements, and the descriptions therefor are not repeated.

FIG. 1 is a cut-away view showing an internal structure of non-aqueous electrolyte secondary battery 1. Non-aqueous electrolyte secondary battery 1 includes battery element 2 formed by laminating and cylindrically winding positive electrode 3 and negative electrode 4 with separator 5 interposed therebetween housed in battery can 7, and filled with non-aqueous electrolyte 6.

Battery can 7 is a cylindrical bottomed container having an opening at the top. As battery can 7, a container formed by molding conductive material such as metal into a predetermined shape can be used. Examples of the conductive material to be used for battery can 7 include iron. It is preferable that a surface of iron material is subjected to electrical conduction treatment such as nickel plating.

Positive electrode 3 is led out as follows. Positive electrode 3 is connected to conductive positive electrode lead 8, and positive electrode lead 8 is connected to sealing member 9 covering the opening at the top of battery can 7. Sealing member 9 becomes protruding cap 10 at the middle part, and works as a positive electrode terminal of non-aqueous electrolyte secondary battery 1.

Safety valve 11 is a mechanism is provided in a vicinity of the positive electrode terminal. When pressure of gas generated by an electrochemical reaction occurring in battery can 7 exceeds a predetermined threshold pressure, safety valve 11 releases the gas as exhaust gas from the inside of battery can 7 to the outside.

Gasket 12 is a member for fixing edges of positive electrode lead 8, sealing member 9, and safety valve 11 together to an edge of the opening at the top of battery can 7. Examples of such gasket 12 include a metal ring, a rubber ring, or the like, having elasticity. Gasket 12 allows sealing member 9 and battery can 7 to be integrated with each other liquid-tightly and air-tightly.

Negative electrode 4 is led out as follows. Insulating plate 13 is disposed at the bottom of battery can 7, so that positive electrode 3 and negative electrode 4 are electrically insulated from battery can 7. Then, a negative electrode lead (not shown) led out from negative electrode 4 bypasses insulating plate 13 and is connected to the bottom part of battery can 7. Thus, a conductor surface of battery can 7 becomes a negative electrode terminal of non-aqueous electrolyte secondary battery 1.

Pipe core 14 is a member as a winding shaft. Positive electrode 3, negative electrode 4 and separator 5 are laminated and cylindrically wound around pipe core 14. Furthermore, pipe core 14 works as a flow passage for guiding gas toward the direction of safety valve 11 when the internal pressure of battery can 7 is increased, and, at the same time, compressively urges wound battery element 2 between pipe core 14 and the inner wall of battery can 7 when compressive force is applied from the outside of battery can 7. As such pipe core 14, a pipe made of stainless steel can be used.

In the above-description, battery can 7 is a negative electrode terminal and cap 10 is a positive electrode terminal or vice versa depending on specifications of non-aqueous electrolyte secondary battery 1. In the latter case, battery can 7 is a positive electrode terminal and cap 10 is a negative electrode terminal.

Figure 2:
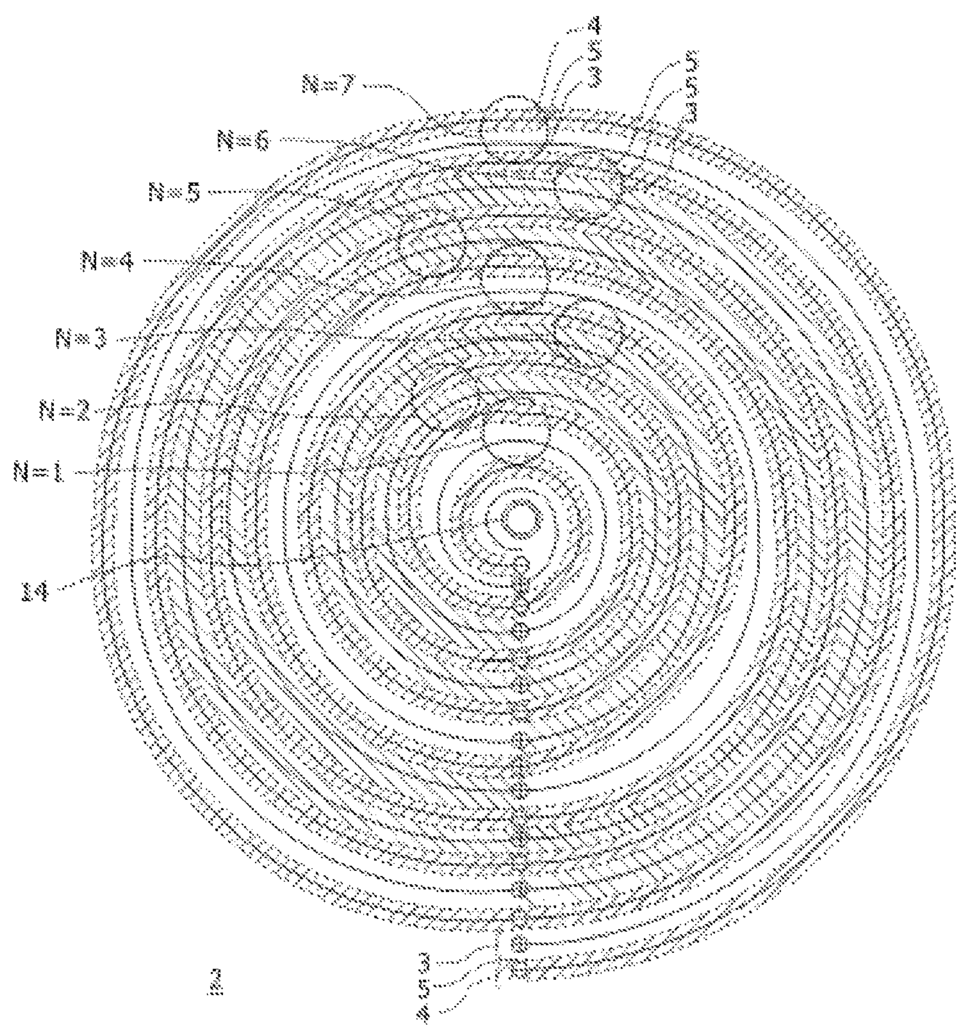
FIG. 2 is a sectional view of the example of the non-aqueous electrolyte secondary battery in accordance with the exemplary embodiment of the present invention.

Next, positive electrode 3, negative electrode 4, separator 5, and non-aqueous electrolyte 6 are described in detail with reference to FIGS. 2 to 6. FIG. 2 is a sectional view taken on a plane perpendicular to the axial direction of battery element 2. Battery element 2 is formed by laminating positive electrode 3, negative electrode 4, and separator 5 to each other, and cylindrically winding the laminate around pipe core 14, and housed in battery can 7, and non-aqueous electrolyte 6 is filled therein. In FIG. 2, the number of winding turns from the inner circumferential end in the vicinity of the outer circumference of pipe core 14 to the outer circumferential end in the vicinity of the inner wall of battery can 7 is seven. From the inner circumferential end side to the outer circumferential end side, positions of certain number of winding turns are represented by N=1, N=2, N=3, N=4, N=5, N=6, and N=7, respectively. The number of winding turns is shown as an example for description, and it may be other number of winding turns.

As shown in FIG. 2, positive electrode 3 has different structures between N=1, 4, and 7 and N=2, 3, 5, and 6. The structure at N=2, 3, 5, and 6 is an ordinary structure. The structure at N=1, 4, and 7 is a safety structure, which enables contact with low resistance between positive electrode 3 and negative electrode 4 even when a short-circuit occurs between positive electrode 3 and negative electrode 4 in battery can 7.

Figure 3:
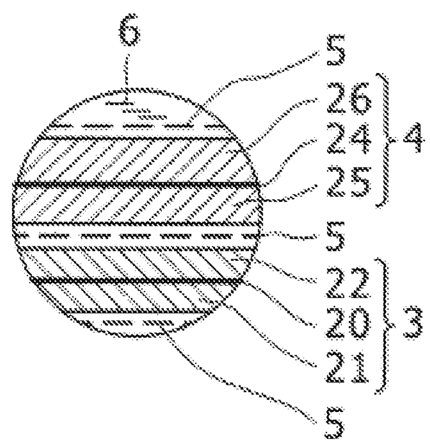
FIG. 3 is a view showing an ordinary structure of a laminate of a positive electrode, a negative electrode, and a separator, in FIG. 2.

FIG. 3 is a view showing details of the ordinary structure at N=2, 3, 5, and 6. Positive electrode 3 has a structure in which positive electrode active material layers 21 and 22 are formed on both surfaces of positive electrode current collector 20, respectively. Negative electrode 4 has a structure in which negative electrode active material layers 25 and 26 are formed on both surfaces of negative electrode current collector 24, respectively. Separator 5 is disposed between positive electrode 3 and negative electrode 4. Positive electrode 3, negative electrode 4, and separator 5 are immersed in non-aqueous electrolyte 6.

Positive electrode current collector 20 is a conductive foil film. As positive electrode current collector 20, a metal foil having an appropriate thickness can be used. It is preferable that material of the metal foil is selected from aluminum, titanium, stainless steel, and the like. Foils having a thickness of about 5 to about 100 μm can be used. For example, an aluminum foil having a thickness of about 8 to about 50 μm can be used. The thickness is preferably about 10 to about 30 μm.

For the positive electrode active material constituting positive electrode active material layers 21 and 22, lithium (Li) composite metal oxide can be used. Examples thereof include $LiCoO_X$, $Li_XNi_YCo_{(1-Y)}O$, $Li_XMnO$, or the like. Such composite metal oxide can be easily obtained by calcination reaction of a lithium compound, such as lithium hydroxide, lithium oxide, lithium carbonate, and lithium nitrate, with metal oxide, metal hydroxide, metal carbonate, metal nitrate, and the like, and, if desired, with other metal compounds.

The thickness per side of positive electrode active material layers 21 and 22 is about 30 to about 300 μm. Preferably, the thickness is about 50 to about 200 μm.

Negative electrode current collector 24 is a conductive foil film. For negative electrode current collector 24, a metal foil having an appropriate thickness can be used. It is preferable that material of the metal foil is selected from copper, nickel, stainless steel, and the like. Foils having a thickness of about 6 to about 50 μm can be used. For example, a copper foil having a thickness of about 6 to about 50 μm can be used. The thickness is preferably about 8 to about 25 μm.

Negative electrode active material layers 25 and 26 include, for example, carbonaceous material. It is preferable that the carbonaceous material is selected from coke, graphite, amorphous carbon, and the like. Shapes of the carbonaceous material may be any shapes of fragment-like, scale-like, and spherical shapes. For example, the thickness of each of negative electrode active material layers 25 and 26 can be made to be about 30 to about 300 μm. The thickness is preferably about 50 to about 200 μm.

Herein, when values of resistance per unit area of positive electrode current collector 20, positive electrode active material layers 21 and 22, negative electrode current collector 24, and negative electrode active material layers 25 and 26 are compared with each other, positive electrode current collector 20 and negative electrode current collector 24 as metal foils show the lowest resistance value, and negative electrode active material layers 25 and 26 as conductive carbonaceous material show the second lowest resistance value although the resistance value is not so low as that of the metal foil. On the contrary, positive electrode active material layers 21 and 22 made of composite metal oxide as a kind of ceramics have remarkably large resistance values. Specific values of the resistance per unit area are different depending upon material and thickness. Roughly speaking, when the resistance value of each of positive electrode current collector 20 and negative electrode current collector 24 is defined as 1, the resistance value of each of negative electrode active material layers 25 and 26 is about 10, and that of positive electrode active material layers 21 and 22 is about 1,000.

Separator 5 is a film made of ion-permeable material. The ion-permeable material is not particularly limited, but examples thereof include woven fabric, non-woven fabric, glass woven fabric, and microporous membrane made of synthetic resin. As the microporous membrane made of synthetic resin, polyolefin-based micro-porous membrane can be used. The melting point of separator 5 is 100° C. or higher, and preferably in a range from about 100° C. to about 200° C. The thickness of separator 5 may be appropriately set, but it can be set at, for example, about 5 to 200 μm.

Figure 4:
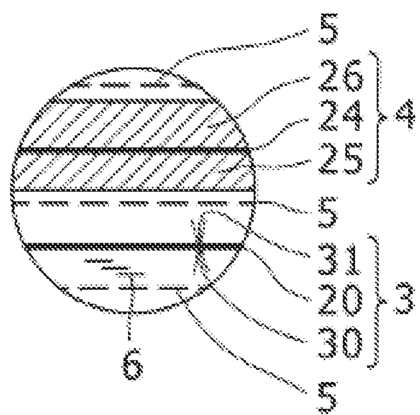
FIG. 4 is a view showing a safety structure of the laminate of the positive electrode, the negative electrode, and the separator, in FIG. 2.
Figure 5:
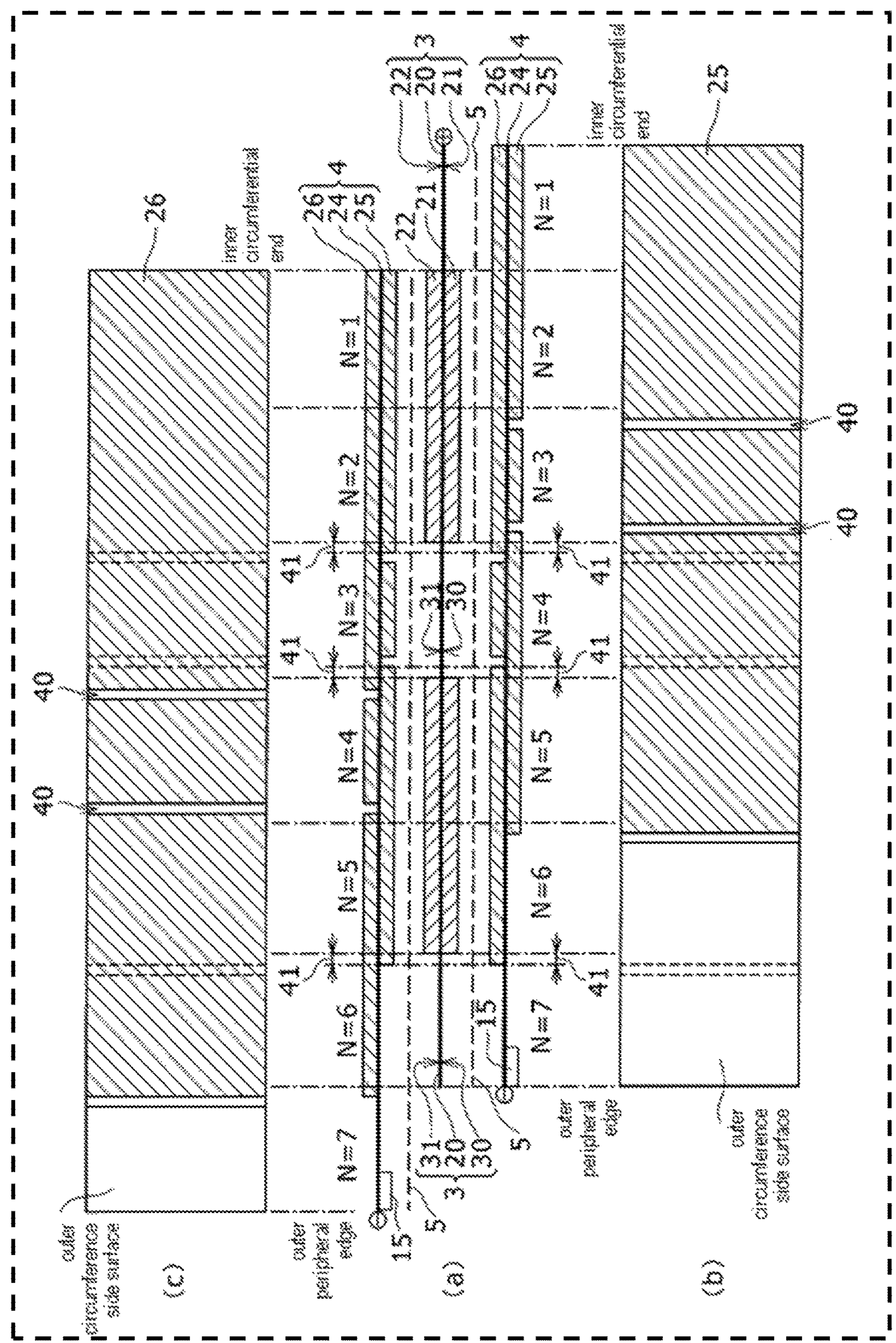
FIG. 5 is a developed view of winding of the positive electrode and the negative electrode of the example of the non-aqueous electrolyte secondary battery in accordance with the exemplary embodiment of the present invention.

FIG. 4 is a view showing details of the safety structure at N=1, 4, and 7. Positions of N=1, 4, and 7 correspond to both ends and an intermediate layer portion of winding of battery element 2. In the safety structure, positive electrode 3 does not include positive electrode active material layers 21 and 22 on both surfaces, that is, inside and outside surfaces of positive electrode current collector 20, but includes positive electrode current-collector-exposed portions 30 and 31 in which positive electrode current collector 20 is exposed. Negative electrode 4, as in the ordinary structure, has a structure in which negative electrode active material layers 25 and 26 are formed on both surfaces of negative electrode current collector 24. However, as illustrated in FIG. 5, negative electrode is provided with a slit as an active material layer separation portion which suppresses diffusion of ions contributing to electromotive force through negative electrode active material layers 25 and 26. Separator 5 and non-aqueous electrolyte 6 are the same as in the ordinary structure.

FIG. 2 shows a safety structure in which positive electrode current-collector-exposed portions 30 and 31 correspond to one turn of winding of battery element 2. This is a minimum turn of winding. It is preferable that positive electrode current-collector-exposed portions 30 and 31 are provided over a length dimension of not less than one turn of the winding at the both ends and the intermediate layer portion of battery element 2.

FIG. 5 is a developed view of the winding of positive electrode 3, negative electrode 4 and separator 5 constituting battery element 2. Battery element 2 is formed by laminating one positive electrode 3, one negative electrode 4, and two separators 5, and winding the laminate around pipe core 14. FIG. 5(*a*) is a view showing a state in which a part of the laminate surface of the winding is developed onto one plane, and FIGS. 5(*b*) and 5(*c*) are views showing a state in which the winding is unwound and developed onto one plane. Herein, positive electrode 3 and negative electrode 4 are laminated and wound. That is to say, positive electrode 3 and negative electrode 4 are wound in such a manner that an outer circumference side surface of positive electrode 3 confronts an inner circumference side surface of negative electrode 4, and an inner circumference side surface of positive electrode 3 confronts an outer circumference side surface of negative electrode 4. Note here that unlike the example described in FIG. 1, FIG. 5 shows an example in which positive electrode active material layers 21 and 22 are disposed at the innermost circumference of positive electrode 3, and instead, negative electrode active material layers 25 and 26 are not disposed at the outermost circumference of negative electrode 4. This is an example for describing positional displacement in the winding of battery element 2, and the innermost and outermost circumferences may have other configurations.

FIG. 5 is a view showing a wound body developed onto a plane, wherein the wound body is formed by winding positive electrode 3 and negative electrode 4 with the outer peripheral edge of the outer circumference side surface of positive electrode 3 and the outer peripheral edge of the inner circumference side surface of negative electrode 4 aligned. In this case, positive electrode 3 and negative electrode 4 are wound such that the outer circumference side surface of positive electrode 3 confronts the inner circumference side surface of negative electrode 4 and the inner circumference side surface of positive electrode 3 confronts the outer circumference side surface of negative electrode 4. Then, due to a difference between the inner and outer circumferences of the winding, at one turn of winding of the number of winding turns N, the outer circumference side surface of positive electrode 3 confronts the inner circumference side surface of negative electrode 4 of the same number N, while the inner circumference side surface of positive electrode 3 confronts the outer circumference side surfaces of negative electrode 4 of the number of winding turns N−1.

FIG. 5(*a*) shows negative electrode 4 confronting the outer circumference side surface of positive electrode 3 in the lower part relative to positive electrode 3 in the paper. Since the outer peripheral edge of positive electrode 3 and the outer peripheral edge of negative electrode 4 are aligned to each other, positive electrode 3 and negative electrode 4 confronting the outer circumference side surface of positive electrode 3 confront each other at the same number of winding turns N. For example, positive electrode current-collector-exposed portion 30 at the outer circumference side at N=4 in positive electrode 3 confronts negative electrode active material layer 26 at the inner circumference side at N=4 in negative electrode 4. Note here that positive electrode current-collector-exposed portion 30 at the outer circumference side at N=7 in positive electrode 3 confronts a negative electrode current-collector-exposed portion at the inner circumference side at N=7 in negative electrode 4.

FIG. 5(*a*) shows negative electrode 4 confronting the inner circumference side surface of positive electrode 3 in the upper part relative to positive electrode 3 in the paper. When positive electrode 3 and negative electrode 4 are laminated and wound with the outer peripheral edge of positive electrode 3 and the outer peripheral edge of negative electrode 4 aligned to each other, positive electrode 3 and negative electrode 4 confronting the inner circumference side surface of positive electrode 3 confront each other in a state in which the number of winding turns N is displaced by only one due to a difference in winding between the inner and outer circumferences as mentioned above. For example, positive electrode current-collector-exposed portion 31 at the inner circumference side at N=4 in positive electrode 3 confronts negative electrode active material layer 25 at the inner circumference side at N=3 in negative electrode 4. Note here that positive electrode current-collector-exposed portion 31 at the inner circumference side at N=7 in positive electrode 3 confronts a negative electrode current-collector-exposed portion at the outer circumference side at N=6 in negative electrode 4. The negative electrode current-collector-exposed portion of negative electrode 4 at N=7 is an outermost circumference of the wound body obtained by laminating and cylindrically winding positive electrode 3, negative electrode 4, and separator 5. In negative electrode 4 of N=7, negative electrode tab 15 is provided. Note here that since positions of N=6 and N=7 of negative electrode 4 correspond to the outermost circumference of the wound body obtained by laminating and cylindrically winding positive electrode 3, negative electrode 4, and separator 5, they are not a level difference which causes negative electrode active material layers 25 and 26 to slip down from negative electrode current collector 24. Note here that positive electrode 3 of N=1 is wound around pipe core 14 in the innermost circumference, no negative electrode 4 confronts positive electrode active material layer 21 at the inner circumference side.

FIG. 5(*b*) is a view of positive electrode 3 in FIG. 5(*a*) seen from the outer circumference side, showing negative electrode active material layer 25 that is the outer circumference side surface of negative electrode 4. FIG. 5(*c*) is a view of positive electrode 3 in FIG. 5(*a*) seen from the inner circumference side, showing negative electrode active material layer 26 that is an inner circumference side surface of negative electrode 4. Note here that negative electrode tab 15 is omitted.

As shown in FIG. 5(*a*), battery element 2 takes a safety structure at N=1, an ordinary structure at N=2 and 3, a safety structure at N=4, an ordinary structure at N=5 and 6, and a safety structure at N=7. Therefore, at N=1, 4, and 7, positive electrode 3 does not include positive electrode active material layers 21 and 22 on both sides, that is, outside and inside of positive electrode current collector 20, but positive electrode 3 includes positive electrode current-collector-exposed portions 30 and 31 in which positive electrode current collector 20 is exposed. On the contrary, at N=2, 3, 5, and 6, positive electrode 3 includes positive electrode active material layers 21 and 22 on both sides, that is, outside and inside of positive electrode current collector 20.

Negative electrode 4 includes negative electrode active material layers 25 and 26 on both surfaces of negative electrode current collector 24 excluding portions provided with slits 40. Slit 40 is an active material layer separation portion for preventing lithium ions, moving from positive electrode 3 to negative electrode 4 through non-aqueous electrolyte 6, from diffusing to negative electrode active material layers 25 and 26 located at portions confronting positive electrode current-collector-exposed portions 30 and 31, when negative electrode active material layers 25 and 26 are provided to portions confronting positive electrode current-collector-exposed portions 30 and 31. Since lithium ions contribute to electromotive force, when this diffuses to negative electrode active material layers 25 and 26 provided to portions confronting positive electrode current-collector-exposed portions 30 and 31, it cannot contribute to electromotive force. As a result, irreversible capacity is increased in non-aqueous electrolyte secondary battery 1.

Slit 40 is provided at an exposed side with respect to both exposed ends of positive electrode current-collector-exposed portions 30 and 31 at a distance of predetermined extended amount 41 away. Slit 40 is provided so as to separate negative electrode active material layers 25 and 26 over the width direction perpendicular to the longitudinal direction. In this way, negative electrode active material layers 25 and 26 laminated on negative electrode current collector 24 are disposed to negative electrode 4 in a part facing positive electrode current collector 20. FIG. 5 shows positive electrode current-collector-exposed portions 30 and 31 in three places. As mentioned above, however, a position of negative electrode 4 confronting positive electrode current-collector-exposed portion 30 and a position of negative electrode 4 confronting positive electrode current-collector-exposed portion 31 are displaced from each other by one turn of winding of the number of winding turns N. Therefore, the position of slit 40 in negative electrode active material layer 25 and the position of slit 40 in negative electrode active material layer 26 are displaced from each other, so that the positions of slits 40 are not overlapped to each other between negative electrode active material layers 25 and 26. Slits 40 are provided in two places in negative electrode active material layers 25 and 26.

The reason why slit 40 is provided so as to have a space of extended amount 41 without being positioned to the both exposed edges of positive electrode current-collector-exposed portions 30 and 31 is to prevent slit 40 from confronting positive electrode active material layers 21 and 22 due to disposition error of slit 40. In slit 40, since negative electrode current collector 24 is exposed, when slit 40 confronts positive electrode active material layers 21 and 22, lithium may be deposited in a portion located from positive electrode active material layers 21 and 22 toward negative electrode current collector 24. In order to prevent lithium from being deposited, extended amount 41 is provided.

In this way, extended amount 41 is provided to prevent lithium from being deposited, while it suppresses increase in irreversible capacity. Extended amount 41 only needs to be larger than the disposition error of slit 40. As an example, extended amount 41 can be made to be several mm.

A separation dimension of negative electrode active material layers 25 and 26 separated by slit 40 only needs to be large enough to block diffusion of lithium ions. For example, the separation dimension can be made to be not more than 1/10 of the exposed length dimension of each of positive electrode current-collector-exposed portions 30 and 31. For example, the separation dimension can be made to be about 5 mm that is 1/10 of the length dimension of one turn of winding of battery element 2 when the exposed length dimension of each of positive electrode current-collector-exposed portions 30 and 31 is about 50 mm.

In the above, slit 40 is provided over the whole width direction of negative electrode active material layers 25 and 26 of negative electrode 4. However, since the function of slit 40 is to suppress the irreversible capacity, the slit is not necessarily provided over the whole width direction of negative electrode 4. For example, a cutting for separating negative electrode active material layers 25 and 26 in the longitudinal direction may be provided in a part in the width direction of negative electrode 4. Furthermore, negative electrode active material layers 25 and 26 may be provided with an appropriate long hole, and a plurality of holes. Furthermore, slit 40 may be a bottomed groove-like slit with a part remaining in the depth direction of negative electrode active material layers 25 and 26.

Note here that slit 40 may not be provided in a case of the specifications in which increase of the irreversible capacity may not be so considered, for example, because the number of winding turns of battery element 2 of non-aqueous electrolyte secondary battery 1 is sufficiently large. In this case, negative electrode 4 does not include an exposed part of negative electrode current collector 24, but includes negative electrode active material layers 25 and 26 over the outside and inside surfaces of negative electrode current collector 24.

Advantages of the above-mentioned configuration are described. When wound-type non-aqueous electrolyte secondary battery 1 is crushed by pressure from the outside, or separator 5 between positive electrode 3 and negative electrode 4 is broken or melted, so that a short-circuit occurs between positive electrode 3 and negative electrode 4 in battery can 7, positive electrode current collector 20 is brought into contact with negative electrode active material layers 25 and 26 at N=1, 4, and 7 having a safety structure. In comparison of the values of resistance per unit area, negative electrode active material layers 25 and 26 have a remarkably low resistance value than those of positive electrode active material layers 21 and 22. Therefore, before positive electrode active material layers 21 and 22 are brought into contact with negative electrode active material layers 25 and 26 and heat generation occurs, a sufficiently large electric current flows between positive electrode current collector 20 and negative electrode active material layers 25 and 26. Thus, even when a short-circuit occurs between positive electrode 3 and negative electrode 4 in battery can 7, abnormal heat generation can be suppressed.

In this configuration, unlike a conventional structure, it is not necessary to dispose positive electrode current collector 20 and negative electrode current collector 24 such that they face each other. Accordingly, safety of non-aqueous electrolyte secondary battery 1 can be secured with a simple configuration. Furthermore, by providing slit 40, it is possible to suppress irreversible capacity generated when positive electrode current collector 20 and negative electrode active material layers 25 and 26 confront each other. Furthermore, although deposition of lithium may occur due to providing of slit 40 when positive electrode current collector 20 and negative electrode active material layers 25 and 26 face each other, it can be prevented by providing of extended amount 41.

Note here that in FIG. 5, positive electrode current-collector-exposed portions 30 and 31 provided in the intermediate layer portion of positive electrode 3 can be provided in one or more places. That is to say, the intermediate layer portion including positive electrode current-collector-exposed portions 30 and 31 is provided between a part located at a distance of one turn from the outermost circumferential end of the winding and a part located at a distance of one turn from the innermost circumferential end of the winding. The number of places provided with positive electrode current-collector-exposed portions 30 and 31 can be determined in consideration of safety and battery capacity.

Figure 6:
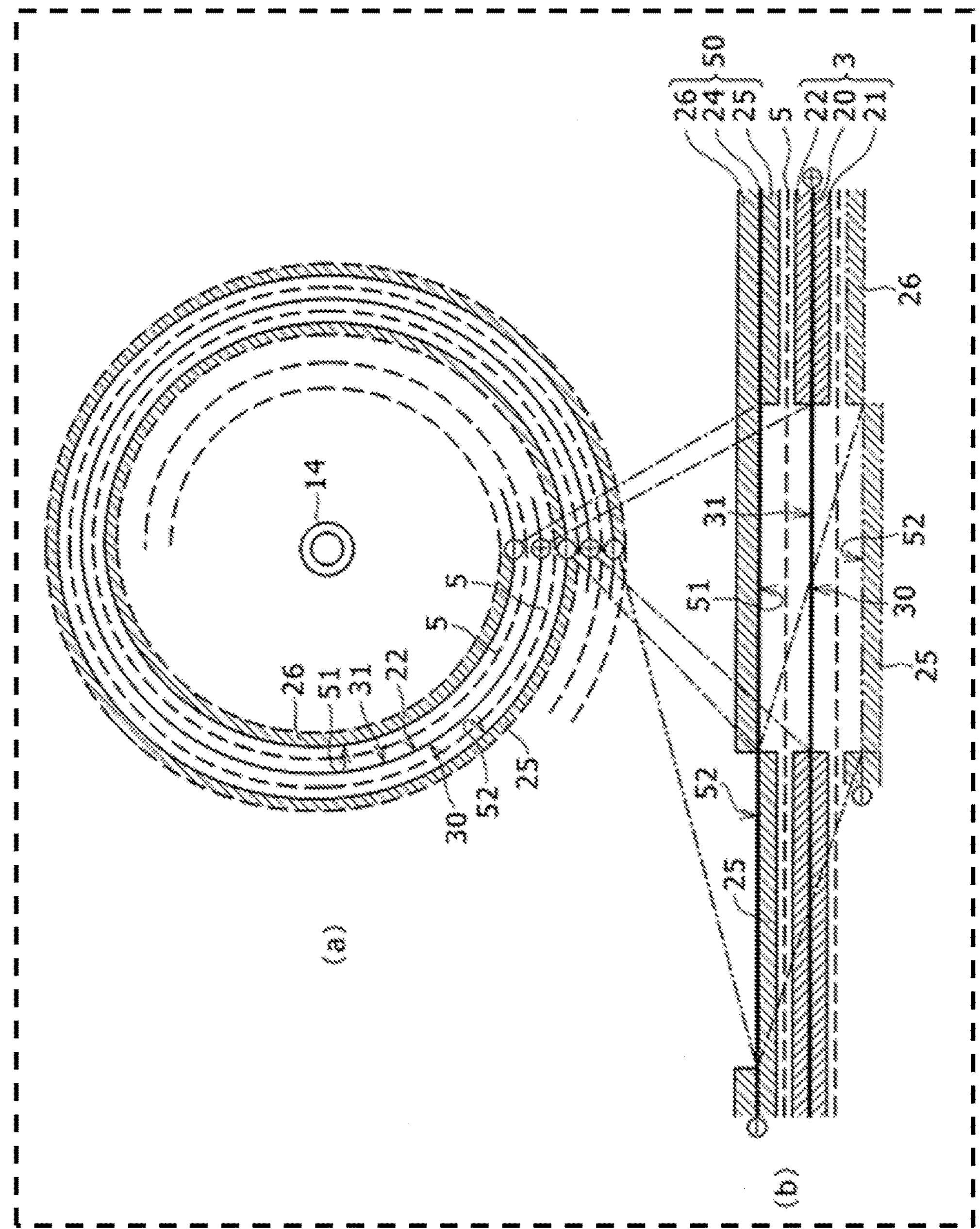
FIG. 6 is a sectional view and a developed view of winding of the positive electrode and the negative electrode of a conventional non-aqueous electrolyte secondary battery.

The above-mentioned advantageous are further described with reference to FIGS. 6 to 8, in comparison with a conventional structure in which positive electrode current collector 20 and negative electrode current collector 24 are disposed so as to face each other. FIG. 6 shows a portion corresponding to the safety structure at N=4 in FIG. 2, (a) is a sectional view showing a wound state, and (b) is a developed view of the winding. Portions corresponding (a) and (b) are linked by an alternate long and short dash line.

Positive electrode 3 includes positive electrode current-collector-exposed portions 30 and 31 without including positive electrode active material layers 21 and 22 on both outside and inside of positive electrode current collector 20. In negative electrode 50, unlike FIG. 2, negative electrode active material layer 25 is not provided in a part confronting positive electrode current-collector-exposed portion 31, but negative electrode current-collector-exposed portion 51 is provided. Similarly, negative electrode active material layer 26 is not provided in a part confronting positive electrode current-collector-exposed portion 30, but negative electrode current-collector-exposed portion 52 is provided.

In this way, in a conventional structure, negative electrode current-collector-exposed portion 52 is disposed to confront positive electrode current-collector-exposed portion 30 over one turn of the winding of battery element 2, and negative electrode current-collector-exposed portion 51 is disposed to confront positive electrode current-collector-exposed portion 31. Thus, positive electrode current collector 20 faces negative electrode current collector 24 over one turn of winding of battery element 2. Therefore, even when positive electrode active material layers 21 and 22 are brought into contact with negative electrode active material layers 25 and 26 inside battery can 7, sufficiently a large amount of electric current can be allowed to flow between positive electrode current collector 20 and negative electrode current collector 24 having a low resistance value per unit, so that positive electrode active material layers 21 and 22 can suppress abnormal heat generation between negative electrode active material layers 25 and 26.

Herein, negative electrode 50 is wound along positive electrode 3 via separator 5. Therefore, when the winding is rewound and developed, as shown in (b), negative electrode current-collector-exposed portion 51 and negative electrode current-collector-exposed portion 52 are displaced from each other by one turn winding of positive electrode 3. This is because non-aqueous electrolyte secondary battery 1 is a wound-type battery, so that a difference occurs between the inner and outer circumference. Battery element 2 is formed by laminating positive electrode 3, negative electrode 50 and separator 5, which have been prepared in advance, and winding the laminate around pipe core 14.

When positive electrode current collector 20 and negative electrode current collector 24 face each other over one turn of winding as in a conventional structure, a place of a number of winding turns in which neither positive electrode current collector 20 nor negative electrode current collector 24 is provided is generated in the winding shown in FIG. 6. Therefore, a large difference in a laminate thickness between a place of the number of winding turns and a place of the neighboring number of winding turns. When the laminate is wound in a state in which the laminate thickness is different, for example, negative electrode active material layers 25 and 26 may be slipped off from negative electrode current collector 24. Thus, a first problem of the conventional structure is difficulty in formation of negative electrode 50.

Another problem of a conventional structure includes that when negative electrode current-collector-exposed portion 51 and negative electrode current-collector-exposed portion 52, which are disposed in different places, are wound, it is necessary to allow negative electrode current-collector-exposed portion 51 to confront positive electrode current-collector-exposed portion 31, and to allow negative electrode current-collector-exposed portion 52 to confront positive electrode current-collector-exposed portion 30. This positioning is considerably difficult and positional displacement easily occurs. This is the second problem.

Figure 7:
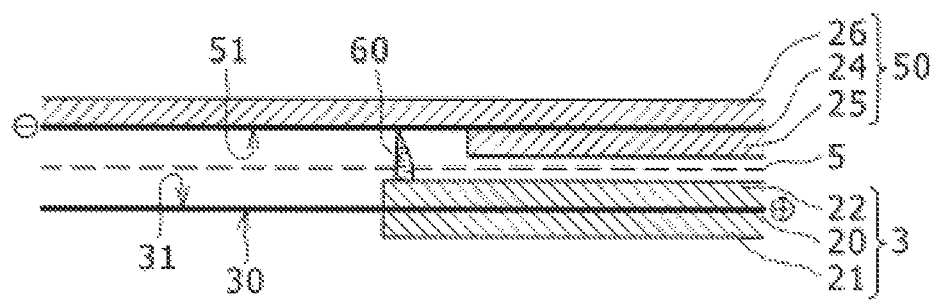
FIG. 7 is a view showing a deposit generated from a positive electrode active material layer toward a negative electrode current collector of a conventional non-aqueous electrolyte secondary battery.
Figure 8:
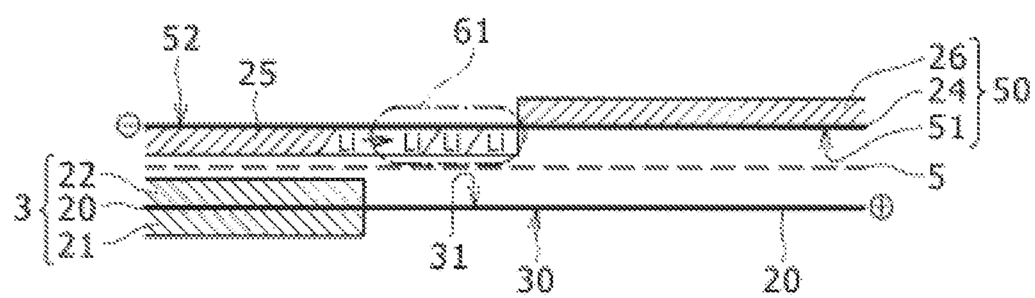
FIG. 8 is a view showing a portion of irreversible capacity generated in the negative electrode of a conventional non-aqueous electrolyte secondary battery.

FIGS. 7 and 8 show cases in which positional displacement occurs in confronting of positive electrode current-collector-exposed portions 30 and 31 and negative electrode current-collector-exposed portions 51 and 52.

FIG. 7 shows a case in which positive electrode active material layer 22 confronts negative electrode current collector 24 due to positional displacement. At this time, deposition of lithium 60 occurs from negative electrode current collector 24 toward positive electrode active material layer 22. When deposition of lithium 60 occurs, a short-circuit occurs between positive electrode 3 and negative electrode 50.

FIG. 8 shows a case in which negative electrode active material layer 25 confronts positive electrode current collector 20 due to positional displacement. At this time, lithium ions flowing from positive electrode 3 to negative electrode 50 move inside negative electrode active material layer 25. In this way, movement 61 of ions contributing to electromotive force toward negative electrode active material layer 25 which does not confront positive electrode active material layer 22. Ions moving to negative electrode active material layer 25 which does not confront positive electrode active material layer 22 become irreversible capacity, and deteriorate charge-discharge efficiency of non-aqueous electrolyte secondary battery 1.

As shown in FIGS. 7 and 8, when positional displacement occurs in confronting of positive electrode current-collector-exposed portions 30 and 31 and negative electrode current-collector-exposed portions 51 and 52, deposition of lithium 60 may occur, or irreversible capacity may increase.

On the contrary, according to the structures described in FIGS. 2 to 4, unlike a conventional structure, it is not necessary that positive electrode current collector 20 and negative electrode current collector 24 are disposed so as to face each other. Safety of non-aqueous electrolyte secondary battery 1 can be secured with a simple configuration. Furthermore, the position of slit 40 in the inner circumference side surface of negative electrode 4 is not overlapped to the position of slit 40 in the outer circumference side surface of negative electrode 4. Consequently unlike a conventional structure, the winding does not include a place provided with neither positive electrode current collector 20 nor negative electrode current collector 24. Thus, for example, it is possible to reduce possibility that negative electrode active material layers 25 and 26 are slipped off from negative electrode current collector 24. Furthermore, when slit 40 having extended amount 41 is provided to negative electrode 4, irreversible capacity can be suppressed and deposition of lithium can be prevented.

The invention claimed is:

1. A non-aqueous electrolyte secondary battery comprising:

a battery element formed by laminating and winding a positive electrode and a negative electrode with a separator interposed there between, wherein the positive electrode includes a positive electrode current collector and a positive electrode active material layer formed on both surfaces of the positive electrode current collector, and the negative electrode includes a negative electrode current collector and a negative electrode active material layer having a lower resistance value than that of the positive electrode active material layer and formed on both surfaces of the negative electrode current collector; and a battery can housing the battery element, wherein the positive electrode includes a positive electrode current-collector-exposed portion, in which the positive electrode current collector is exposed over a length dimension of not less than one turn of the winding of the battery element, in an intermediate layer portion of the winding, the negative electrode includes an active material layer separation portion, which suppresses diffusion of ions contributing to electromotive force through the negative electrode active material layer, at an exposed side with respect to both exposed ends of the positive electrode current-collector-exposed portion, and wherein the positive electrode includes a first end and a second end, each coated on both surfaces with the positive electrode active material layer, and the intermediate layer portion is located between the first end and the second end of the positive electrode, wherein the negative electrode includes a slit having a predetermined separation dimension as the active material layer separation portion.

2. The non-aqueous electrolyte secondary battery of claim 1, wherein the separation dimension of the slit is not more than 1/10 of the length dimension of the exposed positive electrode current-collector-exposed portion.

3. The non-aqueous electrolyte secondary battery of claim 1, wherein the intermediate layer portion of the winding is provided between a part located at a distance of one turn of the winding from an outermost circumferential end of the winding and a part located at a distance of one turn of the winding from an innermost circumferential end.

* * * * *